(12) United States Patent
Lauper

(10) Patent No.: US 8,151,334 B2
(45) Date of Patent: Apr. 3, 2012

(54) COMMUNICATION CARD FOR MOBILE NETWORK DEVICES AND AUTHENTICATION METHOD FOR USERS OF MOBILE NETWORK DEVICES

(75) Inventor: Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 1187 days.

(21) Appl. No.: 11/245,184

(22) Filed: Oct. 7, 2005

(65) Prior Publication Data

US 2006/0080552 A1  Apr. 13, 2006

(30) Foreign Application Priority Data

Oct. 11, 2004  (EP) ..................................... 04104965

(51) Int. Cl.
 *G06F 7/04* (2006.01)
(52) U.S. Cl. ............. 726/9; 726/3; 726/4; 726/5; 726/6; 726/7; 713/186
(58) Field of Classification Search .................. 726/3–9; 382/115, 116; 455/558; 713/186
 See application file for complete search history.

(56) References Cited

U.S. PATENT DOCUMENTS

| | | | |
|---|---|---|---|
| 5,546,463 A | | 8/1996 | Caputo et al. |
| 5,719,950 A | * | 2/1998 | Osten et al. .................... 382/115 |
| 5,987,155 A | * | 11/1999 | Dunn et al. .................... 382/116 |
| 6,173,405 B1 | | 1/2001 | Nagel |
| 6,978,156 B1 | * | 12/2005 | Papadopoulos et al. ....... 455/558 |
| 7,222,360 B1 | * | 5/2007 | Miller ................................ 726/3 |
| 7,663,602 B2 | * | 2/2010 | Jones et al. .................... 345/168 |
| 2001/0017584 A1 | * | 8/2001 | Shinzaki ....................... 340/5.52 |
| 2002/0184509 A1 | * | 12/2002 | Scheidt et al. ................. 713/185 |
| 2003/0163710 A1 | * | 8/2003 | Ortiz et al. .................... 713/186 |
| 2003/0214780 A1 | | 11/2003 | Oh-Yang et al. |
| 2006/0156027 A1 | * | 7/2006 | Blake ............................ 713/186 |
| 2007/0096869 A1 | * | 5/2007 | Trohler ........................ 340/5.52 |

FOREIGN PATENT DOCUMENTS

| | | |
|---|---|---|
| DE | 196 48 767 A1 | 6/1997 |
| DE | 100 53 390 A1 | 5/2002 |
| JP | 4-38507 | 2/1992 |
| JP | 7-41634 | 7/1995 |
| JP | 8-297537 | 11/1996 |
| JP | 10-161804 | 6/1998 |
| JP | 2000-507370 | 6/2000 |
| JP | 2001-125700 | 5/2001 |
| WO | WO 98/38567 | 9/1998 |

OTHER PUBLICATIONS

Lin, Chu-Hsing, Department of Computer Science, Tunghai University, Taiwan "A flexible Biometrics remote user authentication scheme" Elsevier, 2004 ,ISSN 0920-5489.*

* cited by examiner

*Primary Examiner* — Taghi Arani
*Assistant Examiner* — Jason Lee
(74) *Attorney, Agent, or Firm* — McAndrews, Held & Malloy

(57) ABSTRACT

A removable communication card for mobile network devices, respectively a corresponding authentication method, which communication card includes a network interface module for bidirectional transmission of data with a network, an identification module for storing identification data for users, a measurement device for capturing biometric features of a user, and an analysis module with a processor unit for comparison with the stored identification data for the user.

32 Claims, 2 Drawing Sheets

COMMUNICATION CARD FOR MOBILE NETWORK DEVICES AND AUTHENTICATION METHOD FOR USERS OF MOBILE NETWORK DEVICES

BACKGROUND OF THE INVENTION

1. Field of the Invention

The present invention relates to a communication card for mobile network devices and a compatible authentication method for users of the mobile network devices. The communication card stores identification data for a user and the identification data includes data for authentication of the at least one user in the network. The communication card can be used in mobile network devices with PC- and/or PCI-card interface.

2. Discussion of the Background

Worldwide at the present time more and more computer and communication systems are being used to obtain or to transmit data via networks, such as, e.g. a LAN (Local Area Network), a WAN (Wide Area Network) or the Internet via, e.g. the public switched telephone network (PSTN) or a mobile radio network (PLMN: Public Land Mobile Network) such as GSM (Global System for Mobile Communication) or UMTS networks (Universal Mobile Telecommunications System) or WLAN (Wireless LAN), etc.

In particular, data which is subject to charges and/or access-controlled, such as multimedia data, are displayed and/or processed and/or made available to other computer systems in a modified form. Coming under multimedia data are, among other things, digital data such as texts, graphics, pictures, animations, video, Quicktime and sound recordings. Also belonging thereto are MPx (MP3) or MPEGx (MPEG7) standards, as they are defined by the Moving Picture Experts Group.

The reliable, unambiguous and, for the user, trouble-free identification and/or authentication of the user is often difficult with the data subject to charges and/or access-controlled, i.e., data requiring protection. In the state of the art, many different methods can be found relating thereto.

A frequently used method, among others, is the entry of a PIN code, i.e., a personal identification number, by the user. The PIN is either checked and verified using locally stored identification data for the user, or is transmitted, e.g. encrypted, over the network to a central unit, which verifies the PIN based on database entries. The method has many known drawbacks, however. On the one hand, it is, for instance, not very user-friendly since the user has to note the PIN, and the PIN has to be entered via input elements such as, e.g. keyboards. The user often has a multiplicity of PINs nowadays for different devices and/or services which he has to note, which makes the whole thing more difficult for him. Moreover, especially with older people or children, it is not guaranteed that they are able to memorize such PINs without any trouble.

Another problem is that the PINs also do not ensure any reliable fraud-resistant authentication of a user. On the one hand, through unprofessional administration by the user, PINs can easily fall into the hands of third parties and then be easily used by them in fraudulent ways. On the other hand, PINs can also be figured out by third parties, captured in the network, by means of slipped-in codes, such as, e.g. trojans/sniffers, or otherwise ascertained fraudulently.

Designated as sniffer is software which can receive and display the data traffic of a network. A sniffer, e.g. the well-known tcpdump, etheral, Ettercap or RFC 1761, has a so-called non-promiscuous mode and a promiscuous mode. In the non-promiscuous mode, the incoming and outgoing data traffic of the own computer is sniffed. In the promiscuous mode, the sniffer collects the entire data traffic at the network interfaces switched in this mode. Thus not only the frames addressed to it, but also those not addressed to it. To what a frame is addressed is determined in Ethernet networks based on the MAC (Media Access Control) address.

Known in the state of the art is the capturing of biometric features and/or the measurement of physical parameters of an individual in order to determine the identity of the respective person or to verify a purported identity. Biometric features (e.g. fingerprints, retina patterns, etc.) are frequently combined with physical parameters (e.g. blood pressure, temperature, etc.) in order to ensure a greater security. Based on such biometric features and/or physical parameters, a multiplicity of increasingly reliable methods have been developed for verification of individuals in one-to-one as well as in one-to-many methods. Biometrics has thus become a powerful tool in the identification or authentication of persons.

Real-time registration (live capturing) of biometric test samples between a user and a biometric system requires a significant storage capacity, computing power and transmission rate in order to be able to carry out the corresponding biometric analysis functions. In addition, the known methods usually call for complicated installation of hardware and/or software components. Especially with mobile network devices, such as laptops, PDAs (Personal Digital Assistants), mobile radio devices, etc., such components are rarely installed since additional components are cumbersome for the portability of the devices.

Moreover, the usual components for capturing biometric features are not adapted for use with very diverse applications. For the above-mentioned reasons, among others, the use of biometric identification with mobile network devices has not prevailed so far. Nevertheless it is clear that with today's demands for security and user-friendliness, owing to the enormously growing use of mobile network devices, in particular in cellular mobile radio systems, such as e.g. with GSM (Global System for Mobile Communications) and/or UMTS (Universal Mobile Telecommunications System) or in the WLAN (Wireless LAN) area, economical portable biometric systems are desirable.

The international patent application WO 98/11750 shows such an authentication method. The mobile communication device includes a scanning unit for capturing fingerprints. They are forwarded from the mobile communication device to a central authentication system, where they are analyzed and compared with database entries. In the central authentication system, each mobile identification number (MIN) is assigned to a fingerprint of the user.

The patent document U.S. Pat. No. 5,546,463 shows a portable device for authentication of a user and for encryption of data connections to a network. The portable device includes a network interface, for example a modem, as well as a communication interface to a computer, for example a PCMCIA interface. By means of stored electronic key, the portable device is authenticated vis-à-vis the network. Optionally, a PIN entered by a user is transmitted to devices of the network for user authentication.

The published German patent application DE 196 48 767 shows an electronic chipcard with a memory for biometric features, with sensors for capturing biometric features and with means for comparing the stored with the captured biometric features. The chipcard is inserted into a reading device, and biometric features of a user are captured. In the case of agreement, the actual chipcard function, for instance an electronic purse or an access key, is released.

SUMMARY OF THE INVENTION

It is an object of the present invention to provide a new and improved authentication method as well as a corresponding communication card, which are simple and user-friendly, but at the same time meet the modern security demands for users of mobile network devices. It is an object of the invention that the authentication can take place without complicated installations of different hardware components.

These objects are achieved according to the present invention through the elements of the embodiments that will be discussed next. Further advantageous embodiments follow moreover.

In particular, these objects are achieved through one embodiment of the invention in which a removable and/or insertable communication card for mobile network devices, e.g. a PC card according to the Personal Computer Memory Card International Association (PCMCIA) standard or a PCI card according to the Peripheral Component Interconnect (PCI) standard, includes a network interface module for bidirectional transmission of data between the mobile network device and the communication card.

The communication card includes an identification module for storing identification data for users, such as e.g. a Subscriber Identity Module (SIM) or smart card, the identification data including at least data for authentication of a user in the network. The communication card further includes a measurement device for capturing biometric features, e.g. fingerprints and/or retinal characteristics of the human eye, and an analysis module with a processor unit. Through the analysis module, at least one biometric feature of the user is compared with and/or assigned to the stored identification data for the user. The removable communication card can be connected to the network device, e.g. by a contact interface. It is also conceivable, however that the connection to the network device takes place by a contactless (wireless) interface.

The measurement device can be installed, for example, with the contact interface connected, and thus, the at least one biometric feature of the user is able to be captured by the measurement device. The measurement device, e.g. a scanning unit for fingerprints, always remains accessible to the user with the installed communication card. The data for authentication of the user in the network can include, for example, at least the IMSI and/or the MSISDN. This structure has the advantage, among others, that permits a simple and user-friendly authentication method. With the device and the method according to this embodiment, a high degree of portability is ensured. For example, the user needs only to carry along the communication card, and can use the card at any time at locally existing and accessible network devices.

Through the integration of all components according to the embodiment, a complicated coordination of the components by the user becomes unnecessary. The installation and/or integration of additional software components in the mobile network device is likewise not necessary. A further advantage of the embodiment of the invention is, among others, that the user authentication is faster, simple and user-friendlier than the entry of the PIN. Thus it can be carried out by the user using just one finger, for example, without eye strain and/or manipulations using the keyboard.

According to another aspect of the present invention, the identification data further includes a PIN code, which is usable by the user with input elements of the network device for initialization of the identification data. This embodiment variant has the advantage, among others, that the service provider of the network can offer to the customer upon first use of the communication card the simple possibility of initializing the communication card or respectively of assigning his personal biometric data to the corresponding identification data.

In another embodiment variant, the measurement device includes a scanning unit for capturing fingerprints, the scanning unit being installed such that fingerprints of the user are able to be captured with the contact interface connected. With a pushed-in communication card, for example, the scanning unit can be slightly raised above, or can protrude slightly beyond the network housing. This has the advantage that such fingerprint scanner components are easily available today in the state of the art, or respectively on the market, and can be integrated.

In a further embodiment variant, the measurement device is integrated in the identification module, and is thus removable together as a unit. This embodiment variant has the same advantages, among others, as the preceding ones. In addition, the card of this embodiment may thereby be more easily integrated and/or updated.

In another embodiment variant, for connection to the network, the network interface module includes a wirelessly connectible interface and/or one connectible by wire. This has the advantage, among others, that with the communication card the user can easily and optimally react (e.g. in relation to bandwidth, data security, costs, etc.) to local requirements, for instance, without having to worry about the connection of his network device.

In a further embodiment variant, different biometric features are able to be captured by the measurement device, at least one further biometric feature of the user being able to be captured by the measurement device in the case where an initial biometric feature is not able to be assigned unambiguously by the analysis module. This embodiment has the same advantage, among others, that with unclear or ambiguous recognition of the biometric feature, the device and the method have a fallback possibility for authenticating the user nevertheless.

In a still another embodiment variant, the identification data further includes a PIN code, which is usable as a fallback by the user via input elements of the network device if the at least one biometric feature is not unambiguously assignable by the analysis module. This embodiment variant has the same advantages, among others, as the preceding variant, whereby here a plurality of different measurement devices for different biometric features do not necessarily have to be present. This can be especially advantageous when cost effective solutions must be sought.

In an embodiment variant, the measurement device can also capture dynamic values, such as movements of the finger, for example. Thus, by using for example a sensor for fingerprints, not only can the fingerprints themselves be captured, but also the way in which the user places his finger on the sensor or places his finger over the sensor. This can be especially relevant for capacitive fingerprint sensors with lines for example, because the sensors are capable of capturing linear movement and/or rotations of the finger.

In still another embodiment variant, using the sensors of the measurement device, one or more individual physical measurement values are captured for the user, in particular body temperature and/or blood pressure and/or pulse and/or electric currents on the body surface. The sensors are installed on the communication card in such a way that, with the contact interface connected, the one or more individual physical measurement values of the user are able to be captured. This embodiment variant has the advantage, among others, that in the authentication process of the user the security can be further heightened.

It should be stated here that, in addition to the communication card according to the invention, the present invention also relates to a corresponding authentication method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
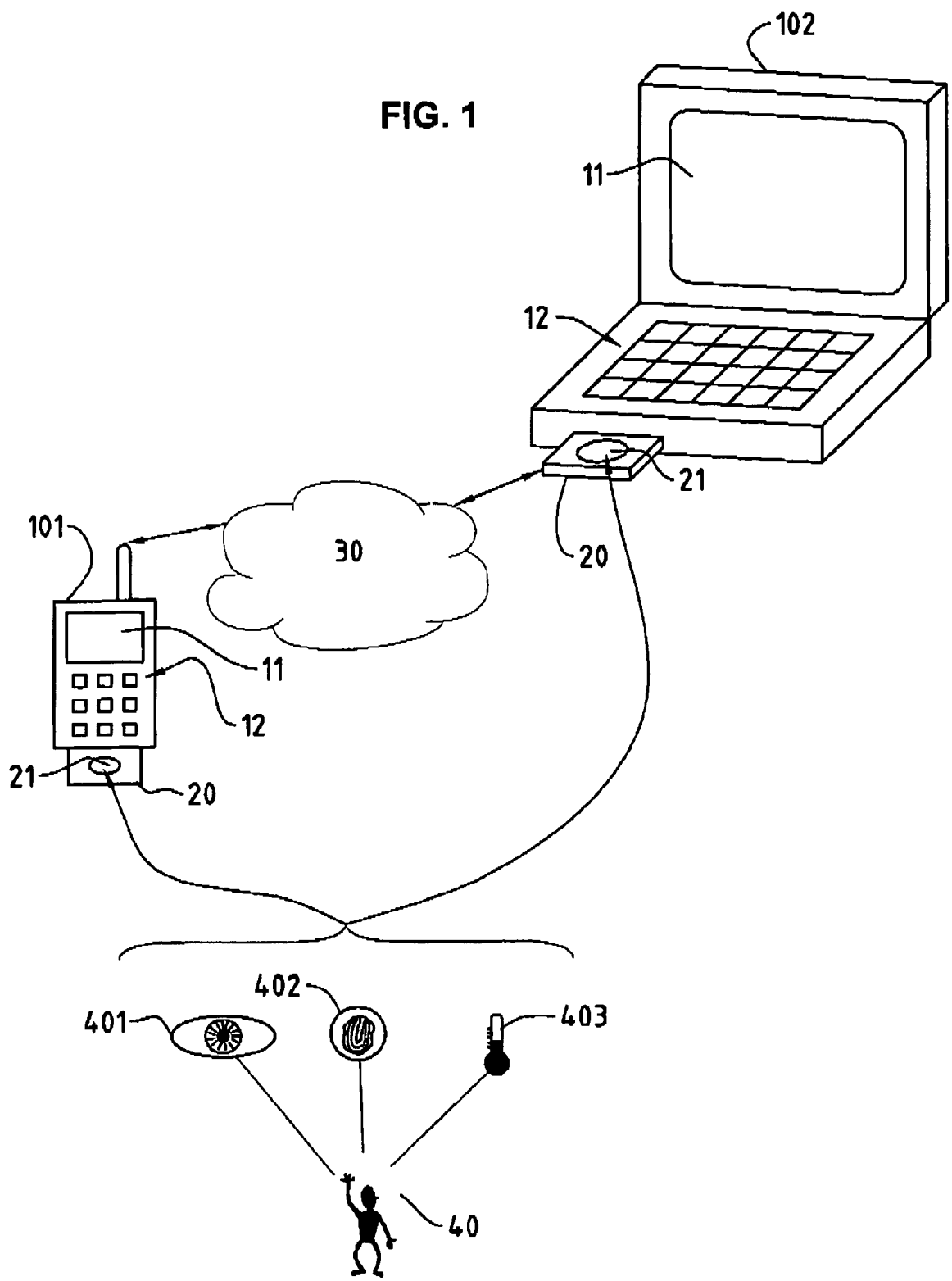
FIG. 1 shows a schematic block diagram of the authentication method.
Figure 2:
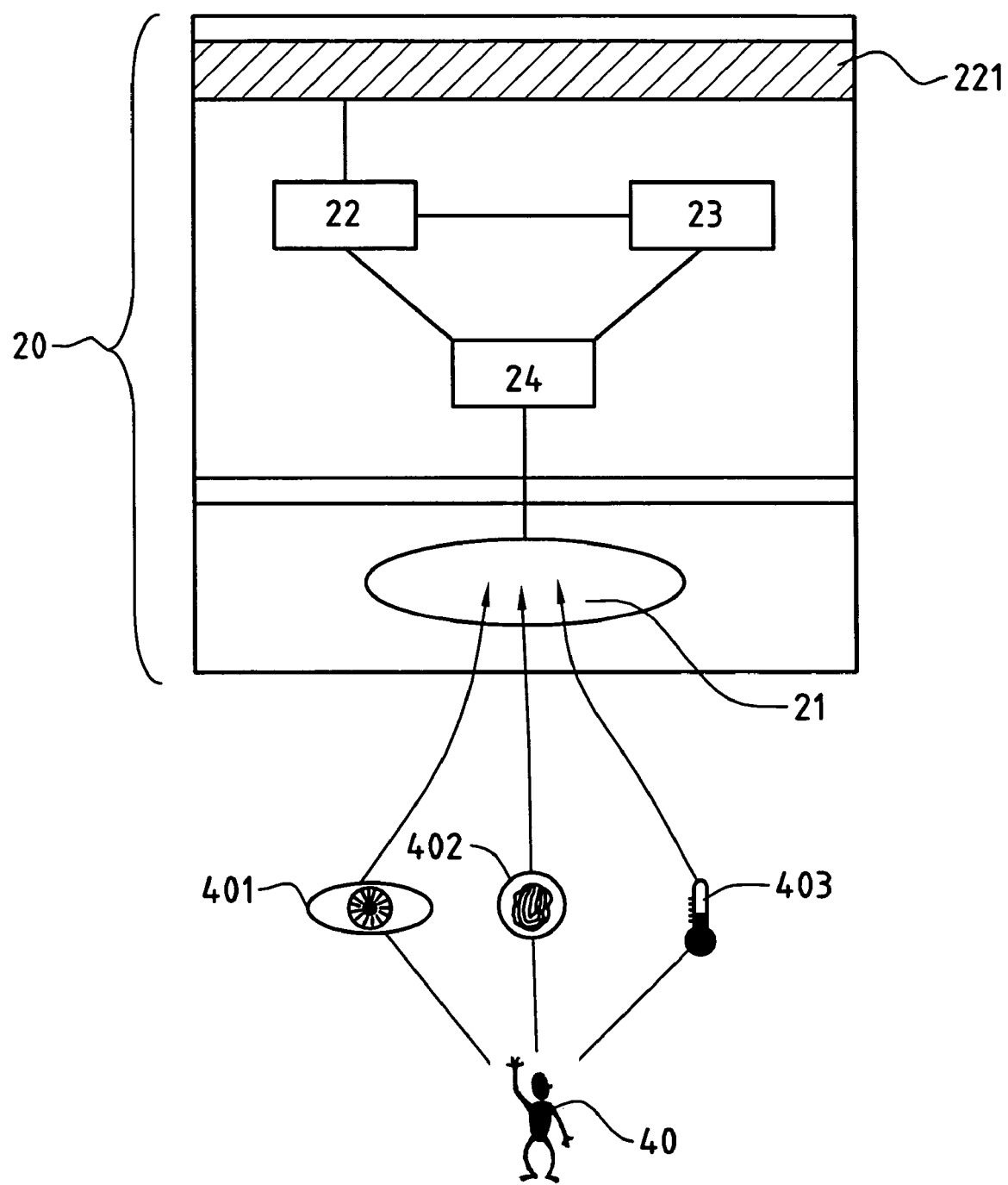
FIG. 2 shows a schematic block diagram of the reusable communication card.

An embodiment of the present invention is described in the following with reference to an example illustrated by the attached FIGS. 1 and 2. Referring now to the drawings, like reference numerals designate identical or corresponding parts throughout the several views.

The removable or insertable communication card 20 for mobile network devices 101/102 includes a network interface module 22 for bidirectional transmission of data between the mobile network device 101/102 and the communication card 20. The communication card 20 includes the necessary hardware- and/or software-achieved components for carrying out the method according to the invention.

The mobile network device 101/102 of the user can be, for example, a PC (Personal Computer), a PDA (Personal Digital Assistant), a mobile radio device and/or a display device such as a television device or a retinal scanning display (in particular, e.g. in combination with a broadcast receiver).

The reference numeral 11 designates a display device, and the reference numeral 12 an input device of the mobile network device 101/102. For connection to the network 30, the network interface module 22 can include, e.g. an interface 221, connectible wirelessly via an antenna and/or by wire via a plug device.

The network 30 can include a communication network such as, for instance, a GSM or a UMTS network, or a satellite-based mobile radio network, and/or one or more fixed networks, for example the public switched telephone network, the worldwide IP-based Internet or a suitable LAN (Local Area Network) or a WAN (Wide Area Network) or a cable TV network or a broadcast network. In particular, it also includes ISDN and XDSL connections.

The bidirectionally transmitted data can also include, e.g. multimedia data such as, among other things, digital data such as texts, graphics, pictures, maps, animations, moving pictures, video, Quicktime, sound recordings, programs (software), program associated data and hyperlinks or links to multimedia data. Belonging thereto are also MPx (MP3) or MPEGx (MPEG4 or 7) standards, as they are defined by the Moving Picture Experts Group. The data can be stored at different places in different networks in a way accessible to the mobile network devices 20. The last-mentioned networks can include, e.g. a LAN (Local Area Network) or a WAN (Wide Area Network), the Internet, broadcast cable networks, PSTN, PLMN, or others.

The removable communication card 20 can be connected to the network device 101/102, for example, by a contact and/or a contactless interface. The removable communication card 20 for mobile network devices 101/102 can be for example, a PC card according to the Personal Computer Memory Card International Association (PCMCIA) standard or a PCI card according to the Peripheral Component Interconnect (PCI) standard. The measurement device 21 can be installed, for example, such that, with the contact interface connected, the at least one biometric feature 401/402 of the user 40 is able to be captured by the measurement device 21.

For example, the measurement device 21 can include a scanning unit for capturing fingerprints 402 and/or retinal characteristics and/or facial features. The scanning unit can be a camera, for instance. The scanning unit can be installed, for example, in such a way that, with the contact interface connected, fingerprints 402 and/or the retinal characteristics of the user 40 are able to be captured.

The measurement device 21 can include additional sensors for capturing one or more individual physical measurement values 403 for the user 40, e.g. body temperature and/or blood pressure and/or eye pressure and/or pulse or other measurement values. The sensors can be installed in such a way, for example, that, with the contact interface connected, the one or more individual physical measurement values 403 for the user 40 are able to be captured.

By combining biometric features with physical measurement values, an increased security can be ensured during authentication. For example, faking the entry of the biometric features (here of the fingerprints) using an artificial finger can be prevented if the finger temperature and/or blood pressure in the finger and/or pulse in the finger of the user, etc., are measured at the same time.

The communication card 20 includes an identification module 23 for storing identification data of the users 40. The identification data includes at least authentication data of a user 40 in the network 30. The identification module 23 can be or can include a Subscriber Identity Module (SIM) or a smart card, for example. The data for authentication of the user 40 in the network 30 can include at least the IMSI (International Mobile Subscriber Identity) and/or the MSISDN (Mobile Subscriber Integrated Services Digital Network) number.

The communication card 20 includes a measurement device 21 for capturing biometric features 401/402 of the user 40. The communication card 20 further includes an analysis module 24 with a processor unit. With the analysis module 24, the at least one biometric feature 401/402 of the user 40 is analyzed and compared with the stored identification data for the user 40. The analysis module 24 can be implemented by hardware and/or software. If the corresponding comparable identification data are assignable, the user 40 is authenticated. The identification module 23 can be, e.g. removable from the communication card 20. A high transportability of the biometric features from one communication card 20 to another thereby results in that the learning processes for entry of the biometric features are unnecessary with each new communication card 20.

It can be expedient, for example, for different biometric features 401/402 to be able to be captured by the measurement device 21. Thus in the case of a biometric feature 401/402 not being able to be unambiguously assigned to a user 40 by the analysis module 24, at least one further biometric feature 401/402 for the user 40 can be captured by the measurement device 21, for example, in order to ensure the clarity of the assignment. This feature would be able to be used as a fallback method for the communication card 20.

Another possibility is for the identification data to include in addition a PIN code which is usable as a fallback by the user 40 via the input elements of the network device 101/102, if the at least one biometric feature 401/402 is not able to be assigned unambiguously by the analysis module 24.

For initialization of the communication card 20, i.e., with the first-time storing of identification data for the user 40, the identification data can additionally include a PIN code that is usable by the user 40 via input elements 12 of the network device 101/102 during the initialization of the identification data.

In the case of a multi-protocol card 20, which simultaneously supports, e.g. the protocols GSM (Global System for Mobile Communication), GPRS (Generalized Packet Radio Service), WLAN (Wireless Local Area Network) and UMTS (Universal Mobile Telecommunications System), the same biometric identity may be used for all the communication networks 30, which are assigned by the analysis module 24 with the respective identities in the respective communication networks 30. The method according to the invention is especially suitable for seamless handover communication cards 20.

Numerous modifications and variations of the present invention are possible in light of the above teachings. It is therefore to be understood that within the scope of the appended claims, the invention may be practiced otherwise than as especially described herein.

The invention claimed is:

1. A removable communication card for a network device, the removable
   communication card comprising:
   a network interface module for bidirectional transmission of data between the network device and the removable communication card;
   an identification module configured to store identification data for users, the identification data having data for authentication of the users in the network;
   a measurement device configured to capture a first and a second biometric feature of one user from said users, the first biometric feature being different from the second biometric feature, and wherein the measurement device is configured to capture the first and the second biometric feature of the one user when an interface is connected to the network device; and
   an analysis module having a processor unit, the analysis module being configured to verify a match between the first and the second biometric feature of the one user and the stored identification data to authenticate the one user, wherein
   the identification data further includes a code that is entered by the one user via input elements of the network device for initialization of the identification data, and wherein
   (i) the measurement device captures the first biometric feature of the one user, (ii) the analysis module verifies a match between the first biometric feature and the identification data, (iii) in a case where the first biometric feature cannot be unambiguously assigned to the one user, (iv) the measurement device captures the second biometric feature of the one user, and (v) the analysis module verifies a match for the second biometric feature with the identification data to authenticate the one user.

2. The removable communication card according to claim 1, wherein the interface comprises a contact interface.

3. The removable communication card according to claim 2, wherein the measurement device comprises a scanning unit configured to capture fingerprints, the scanning unit being installed such that when the contact interface is connected to the network device, the scanning unit captures fingerprints of the one user.

4. The removable communication card according to claim 1, wherein the interface comprises a contactless interface.

5. The removable communication card according to claim 1, wherein the network interface module comprises an interface that is configured to connect to the network wireless and/or by a wire.

6. The removable communication card according to claim 1, wherein the code which is usable by the one user as a fallback and is entered by the one user via input elements of the network device when the first biometric feature is not unambiguously assignable by the analysis module to the one user.

7. The removable communication card according to claim 1, wherein the identification module comprises a Subscriber Identity Module (SIM).

8. The removable communication card according to claim 1, wherein the identification module comprises a smart card.

9. The removable communication card according to claim 1, wherein the authentication data of the users in the network comprises at least IMSI and/or MSISDN.

10. The removable communication card according to claim 1, wherein the measurement device is integral with the identification module.

11. The removable communication card according to claim 1, wherein the measurement device is configured to capture dynamic values of the one user.

12. The removable communication card according to claim 11, wherein the dynamic values include movements of a finger of the one user.

13. The removable communication card according to claim 1, wherein the removable communication card is a PC card or a PCI card.

14. The removable communication card according to claim 1, wherein the measurement device further comprises sensors configured to capture one or more individual physical measurement values for the one user when the contact interface is connected to the network device.

15. The removable communication card according to claim 14, wherein the one or more individual physical measurement values include at least one of body temperature, blood pressure, pulse, and electric current on the body surface of the one user.

16. An authentication method for users of network devices using stored identification data for users, the identification data having data for authentication of users in the network, the method comprising:
   identifying one user from said users by a code via input elements of the network device;
   capturing a first biometric feature by a measurement device of a removable communication card of the one user and transmitting the captured first biometric feature to an analysis module of the removable communication card;
   comparing the first biometric feature of the one user with stored biometric identification data for the one user by a processor unit of the analysis module;
   authenticating the one user in the network upon a successful matching of the captured first biometric feature of the one user with the stored biometric information data by a network interface module of the removable communication card, and transmitting data bidirectionally between the network device and the removable communication card;
   capturing a second biometric feature of the one user in a case where said step of comparing cannot unambiguously assign the captured first biometric feature to the one user, the second biometric feature being different from the captured first biometric feature and wherein the measurement device is installed on the removable communication card and is configured to capture the at least the first and the second biometric feature of the one user when an interface is connected to the network device; and comparing the second biometric feature of the one user with stored biometric identification data.

17. The authentication method according to claim 16, wherein the interface comprises a contact interface.

18. The authentication method according to claim 17, further comprising:

capturing fingerprints of the one user by a scanning unit of the measurement device when the contact interface is connected.

19. The authentication method according to claim 16, wherein the interface comprises a contactless interface.

20. The authentication method according to 16, further comprising:

connecting the removable communication card and the network by at least one of a wireless interface and a wired interface.

21. The authentication method according to claim 16, further comprising:

authenticating the one user by a PIN code entered via input elements of the network device if the first biometric feature is not able to be assigned unambiguously by the analysis module.

22. The authentication method according to claim 16, further comprising:

identifying the one user by a PIN code entered via input elements of the network device upon a first-time capturing of the first biometric feature of the one user.

23. The authentication method according to claim 16, wherein the identification module is a Subscriber Identity Module (SIM).

24. The authentication method according to claim 16, wherein the identification module is a smart card.

25. The authentication method according to claim 16, wherein the authentication data of the users in the network is at least the IMSI.

26. The authentication method according to claim 16, wherein the measurement device is integral with the identification module.

27. The authentication method according to claim 16, wherein the measurement device comprises means for capturing dynamic values of the one user.

28. The authentication method according to claim 27, wherein the dynamic values include movements of the finger of the one user.

29. The authentication method according to claim 16, wherein removable the communication card is at least one of a card according to the Personal Computer Memory Card International Association (PCMCIA) standard and a card according to the Peripheral Component Interconnect (PCI) standard.

30. The authentication method according to claim 16, further comprising:

capturing one or more individual physical measurement values of the one user based on sensors of the measurement device installed on the removable communication card.

31. The authentication method according to claim 30, wherein the one or more individual physical measurement values of the one user include at least one of body temperature, blood pressure, pulse, and electric currents on the body surface of the one user.

32. The removable communication card according to claim 1, wherein the measurement device is a scanning unit having a camera.

* * * * *